Feb. 20, 1951             J. GORBY             2,542,133

APPARATUS AND METHOD FOR CANNING FISH

Filed Aug. 3, 1948                                    8 Sheets—Sheet 1

INVENTOR.
JACK GORBY,
BY
John Flann
ATTORNEY.

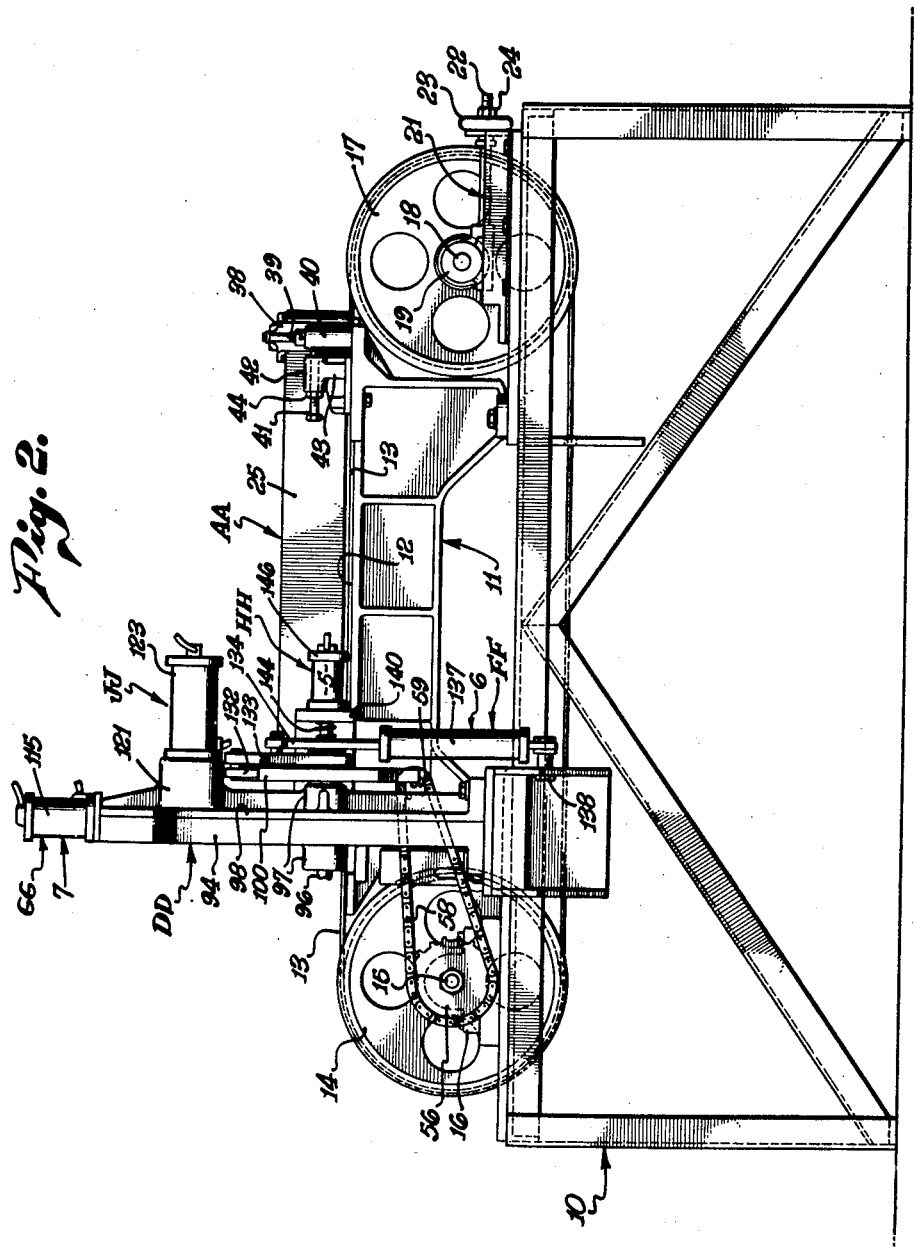

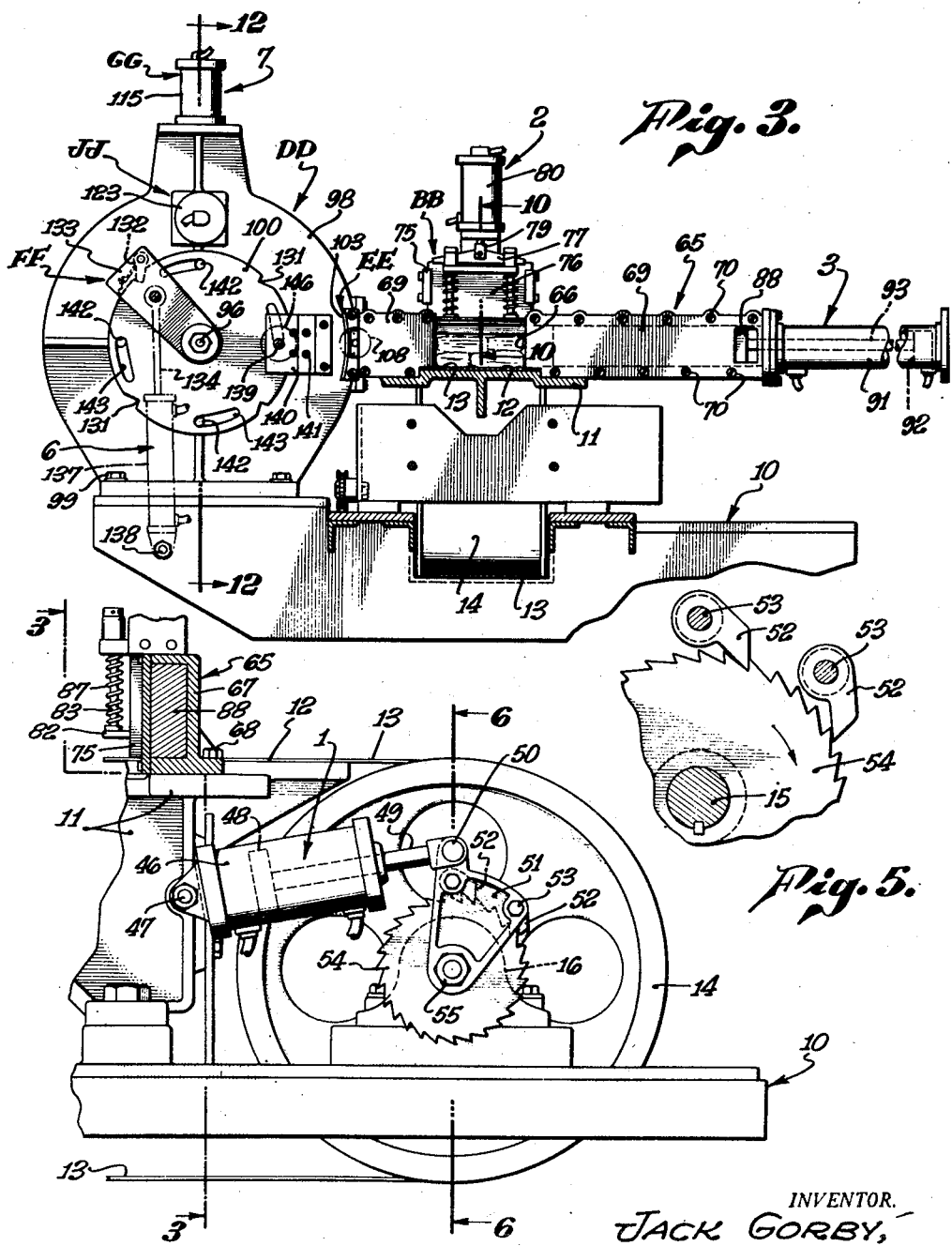

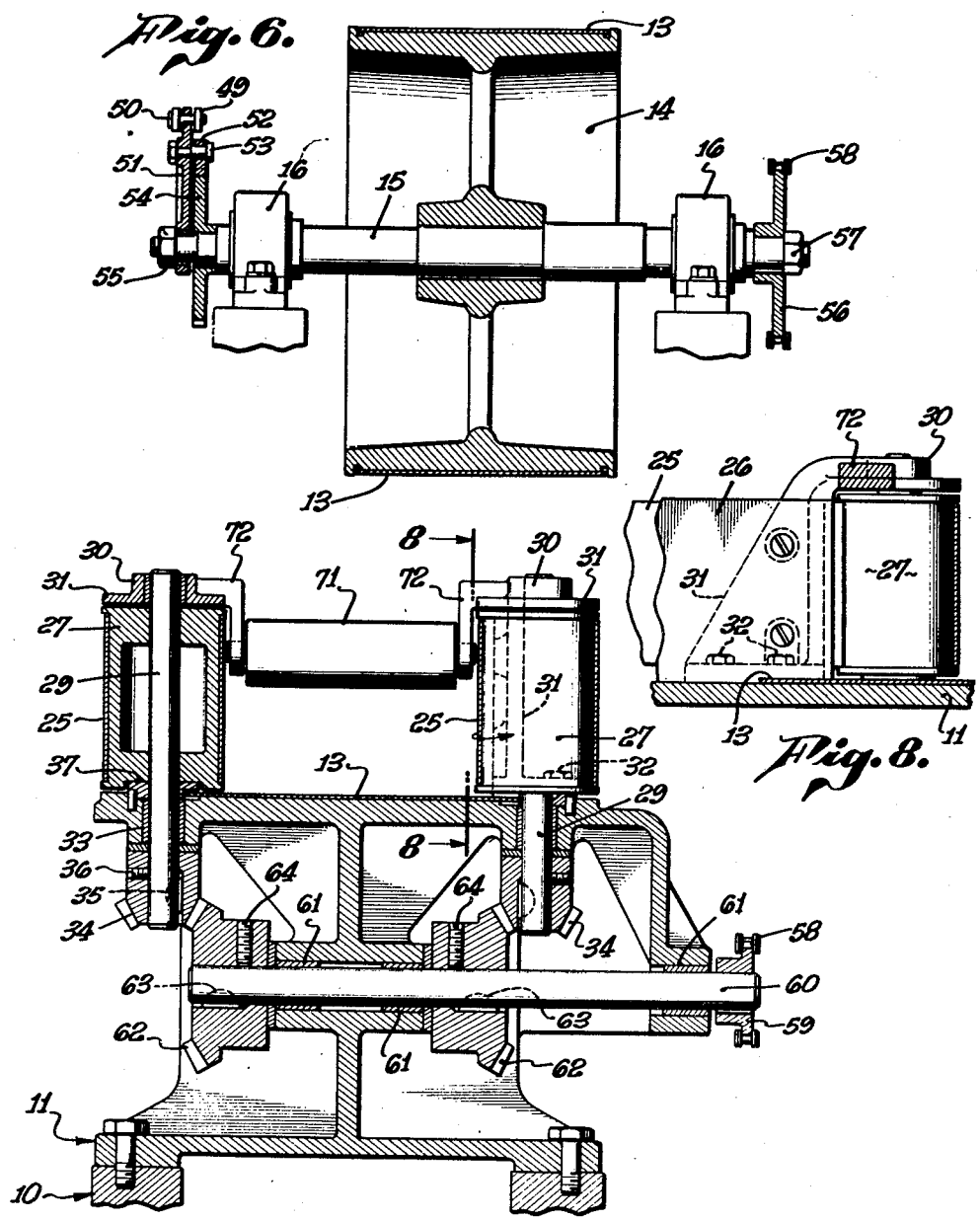

Feb. 20, 1951 J. GORBY 2,542,133
APPARATUS AND METHOD FOR CANNING FISH
Filed Aug. 3, 1948 8 Sheets-Sheet 5
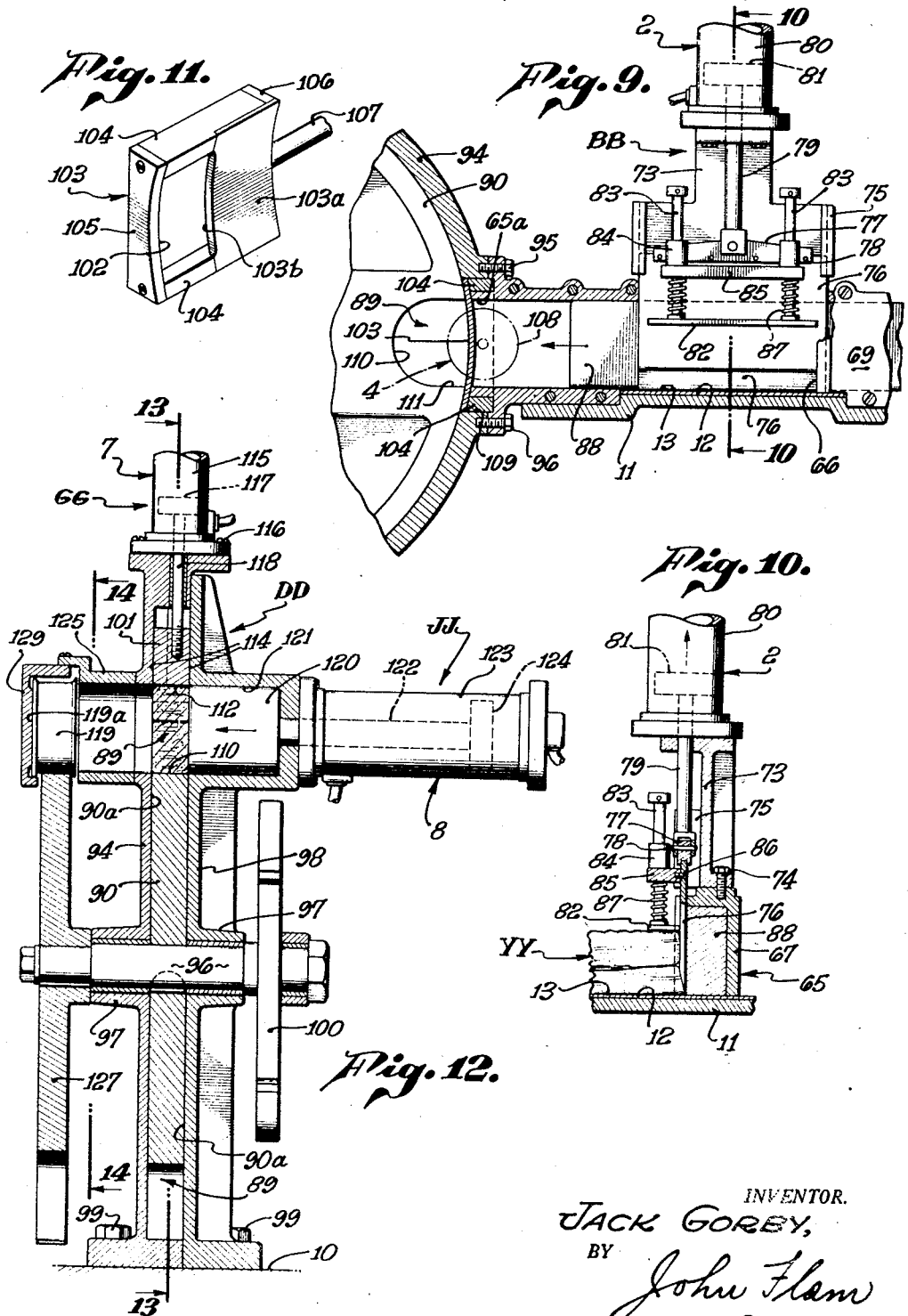
INVENTOR.
JACK GORBY,
BY
John Flam
ATTORNEY.

Feb. 20, 1951  J. GORBY  2,542,133
APPARATUS AND METHOD FOR CANNING FISH
Filed Aug. 3, 1948  8 Sheets-Sheet 6

INVENTOR.
JACK GORBY,
BY
John Flann
ATTORNEY.

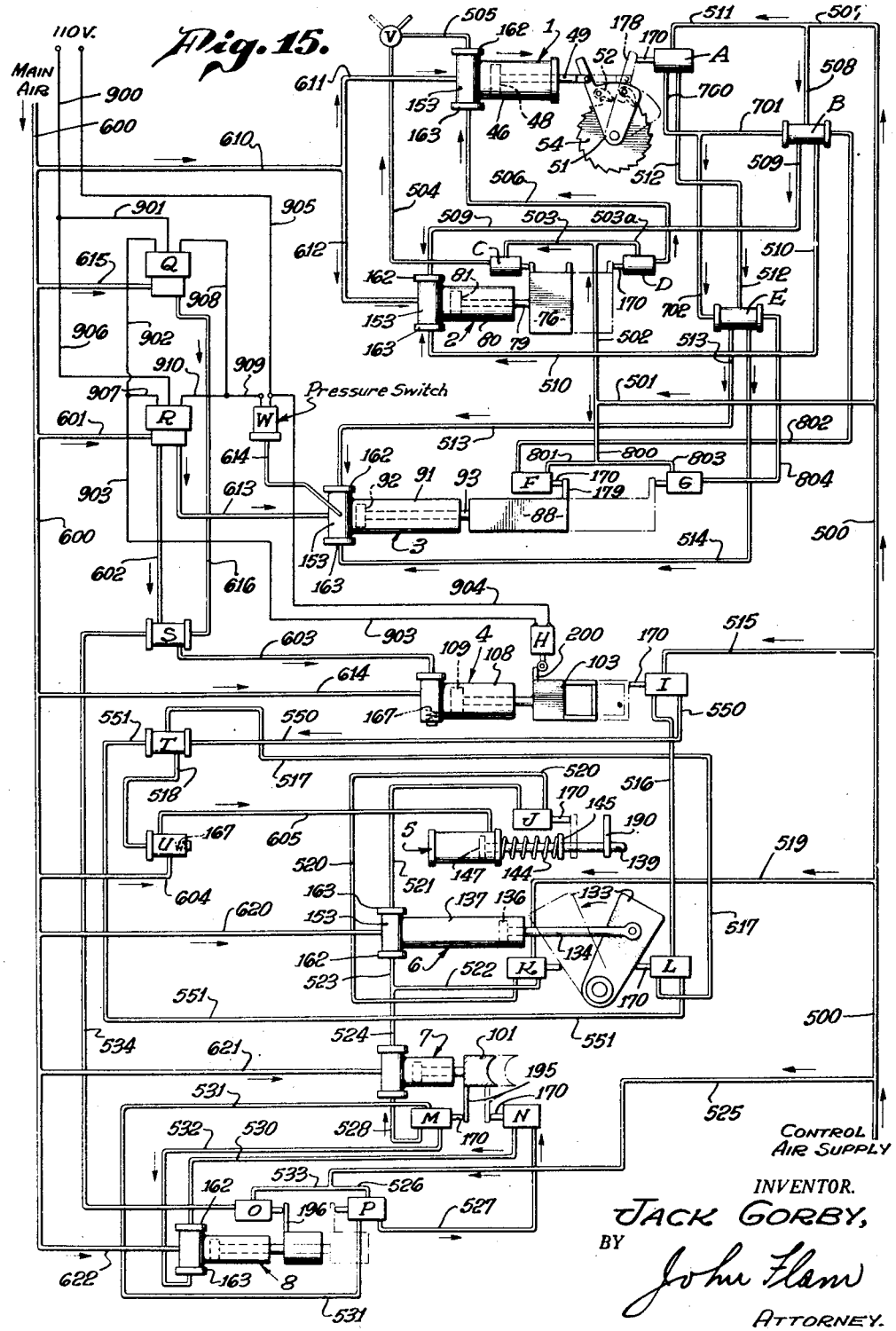

Feb. 20, 1951         J. GORBY         2,542,133
APPARATUS AND METHOD FOR CANNING FISH
Filed Aug. 3, 1948                              8 Sheets-Sheet 8
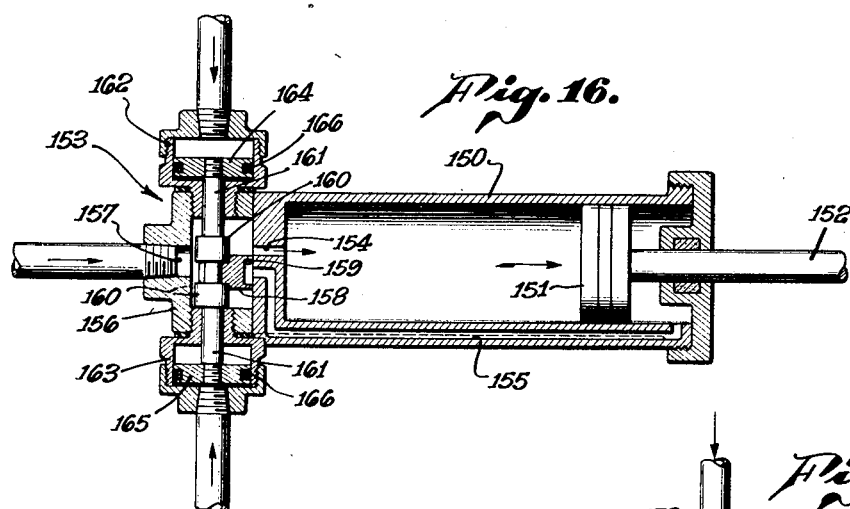
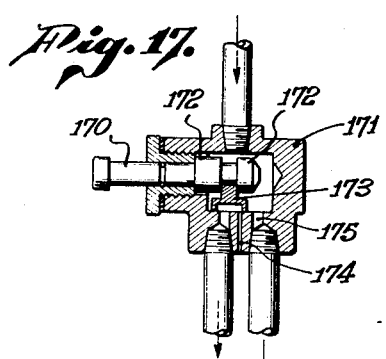
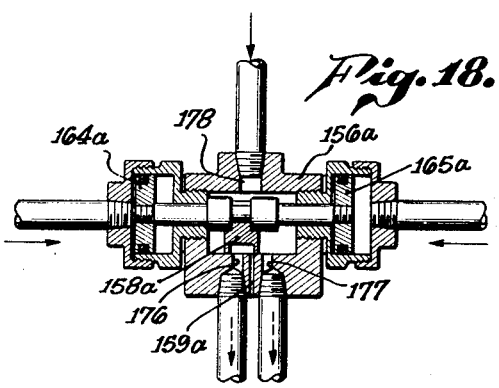
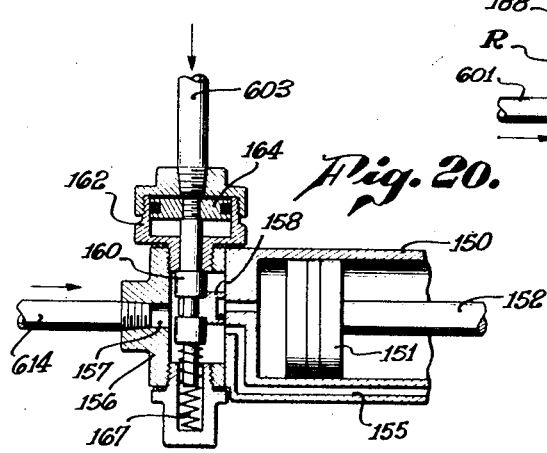
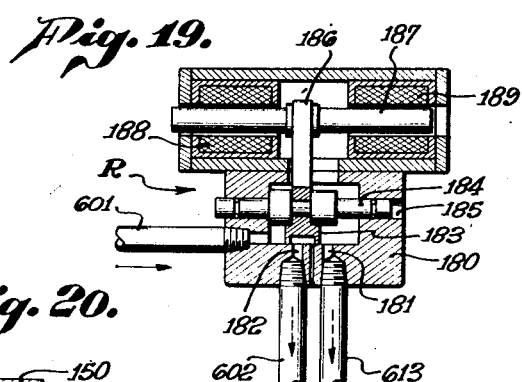
INVENTOR.
JACK GORBY,
BY
John Flam
ATTORNEY.

UNITED STATES PATENT OFFICE 2,542,133

APPARATUS AND METHOD FOR CANNING FISH

Jack Gorby, Los Angeles, Calif.

Application August 3, 1948, Serial No. 42,292

29 Claims. (Cl. 99—188)

The present invention relates to the packaging of food products, and more particularly to the canning of fish.

Certain difficulties arise in connection with the canning of fish. It is usual to form some fish into individual masses of predetermined dimensions preparatory to their insertion into cans. The formation occurs as a result of compressing the fish, which, in some instances, produces masses of fish lacking in uniformity, apparently due to the variations in the size, shape and texture of the particular fish being compacted. This lack of uniformity affects the appearance of the fish masses in the can.

Tuna fish, and other fishes that are precooked preparatory to canning, have not heretofore lent themselves to commercial canning without the introduction of extensive hand operations. The fish has been cooked, weighed and packed into cans by hand. During packing, the fish is pressed by hand against the sides of the can or other container. In view of the tendency for the precooked fish to disintegrate, it must be handled carefully, but despite such careful handling pieces break off, which are collected and packed as grated fish sold at a lesser price. In addition, the contacting or pressing of the fish against the cans may produce its scorching during its final cooking in the can.

It is evident that all of the foregoing hand operations in the canning of precooked fishes are time consuming and costly. In view of the human element involved, they lend themselves to the introduction of errors, and also present problems in sanitation.

Accordingly, an object of the present invention is to insure the packing of fish in cans, or other containers, with a greater degree of uniformity.

Another object of the invention is to subject masses of fish to a uniform compacting pressure in order to obtain uniform units of fish for insertion into cans and the like.

A further object of the invention is to provide pressuring apparatus for forming fish into compact masses or units of uniform weight, regardless of the quantity of fish in the apparatus.

Another object of the invention is to provide pressuring apparatus for forming fish into compact masses or units of uniform weight, and which will not perform a compacting operation if insufficient fish is in the apparatus.

A further object of the invention is to provide pressuring apparatus for forming precooked fish, such as tuna fish, into compact masses or units without disintegrating or otherwise adversely affecting the structure of the fish.

Still another object of the invention is to provide an improved method and apparatus for canning fish, including precooked fish.

A further object of the invention is to eliminate substantially entirely hand operations in the canning of tuna fish, and other fish usually cooked preparatory to canning.

Another object of the invention is to provide automatic canning apparatus for conveying, cutting and forming fish fillets into predetermined dimensions and weight, and then automatically placing the formed masses into cans.

Still a further object of the invention is to provide automatic canning apparatus, in which very little of the fish, including precooked fish, breaks off during the canning operation.

Yet another object of the invention is to provide a method and apparatus for canning fish, including precooked tuna fish and the like, which eliminates substantially all hand operations, and which insures a more uniform and sanitary pack.

A still further object of the invention is to introduce tuna fish and the like into cans in such manner as to prevent their scorching upon final cooking.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 2 is a side elevation of the apparatus;

Fig. 3 is a section taken along the line 3—3 on Fig. 4;

Fig. 4 is an enlarged vertical section taken along the line 4—4 on Fig. 1;

Fig. 5 is a fragmentary view of part of the pawl and ratchet conveyor drive mechanism;

Fig. 6 is a cross-section taken along the line 6—6 on Fig. 4;

Fig. 7 is an enlarged vertical section taken along the line 7—7 on Fig. 1;

Fig. 8 is a vertical section taken along the line 8—8 on Fig. 7;

Fig. 9 is an enlarged view, partly in section, of a portion of the apparatus as disclosed in Fig. 3;

Fig. 10 is a section taken along the line 10—10 on both Figs. 3 and 9;

Fig. 11 is an isometric view of the cut-off knife for a partially formed mass of fish;

Fig. 12 is an enlarged vertical section taken along the line 12—12 on Fig. 3;

Fig. 15 is a diagrammatic view of the system for controlling the sequence of operations in the apparatus;

Fig. 16 is a longitudinal section through one form of fluid motor and control valve for operating different parts of the apparatus;

Fig. 17 is a longitudinal section through one form of control valve for determining the different operations of the apparatus;

Fig. 18 is a longitudinal section through an air relay or valve employed in controlling the flow of air to other valve mechanisms and fluid motors;

Fig. 19 is a longitudinal section through a solenoid operated valve employed in the system;

Fig. 20 is a longitudinal section through a fluid motor and another form of control valve for determining the passage of air to and from the motor;

Figure 1:
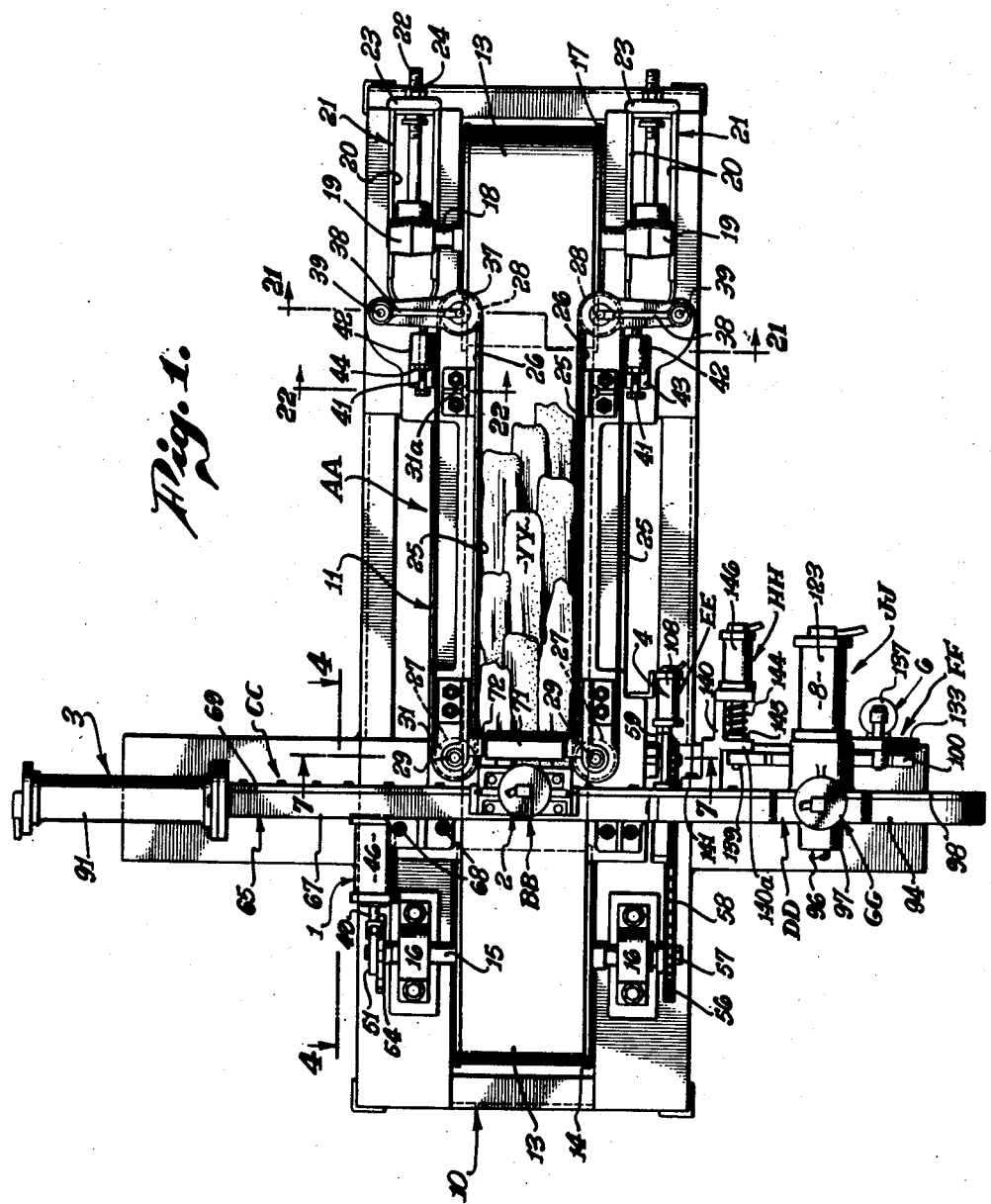
Figure 1 is a top plan view of a canning apparatus embodying the invention.

The apparatus disclosed in the drawings is a machine particularly designed for operating upon fish fillets YY, such as cooked tuna fish. It serves the purpose of compacting a quantity of the fillets to a predetermined size, shape and weight, and then inserting the mass of fish thus produced into a can or other container.

The machine includes a conveyor device AA for feeding the fish fillets, as needed, under a cut-off device BB into an extrusion or compacting mechanism CC. The extrusion mechanism forces the fish into a forming device or turret DD, at which point the mass is severed by a cut-off mechanism EE. The turret device is rotated by an indexing mechanism FF to a forming station GG, at which it is positively centered by an indexing device HH, which also aligns it with the extrusion device CC. The mass of fish in the turret is then compacted to its final form, which is usually cylindrical, whereupon an ejecting device JJ discharges it into a can that has been fed in timed relation with the turret wheel to a position in alignment with the formed fish. The canned fish is then moved automatically to another desired point.

The apparatus is mounted upon a suitable supporting frame 10, upon which rests a table 11 having a horizontal upper surface 12 along which a horizontal main conveyor or feed belt 13 travels. This feed belt, which is preferably metallic, passes over a driving pulley 14 at the forward end of the machine, which is keyed, or otherwise suitably attached, to a shaft 15 rotatable within bearing supports or pillow blocks 16 suitably attached to the supporting frame 10. The belt also passes over an idler pulley 17 at the rear of the machine, such pulley being attached to an idler shaft 18 rotatable within bearing supports 19 that are adjustable in a direction lengthwise of the machine, in order to appropriately tension the belt.

As disclosed in the drawings, the bearing blocks 19 are slidable within slots or guides 20 formed in a take-up frame 21 secured to the main supporting frame 10. Adjusting rods 22 are secured to these blocks and have their outer ends threaded for cooperation with companion threads in adjusting wheels 23 adapted to bear against the end of the take-up frame 21. By appropriately turning the adjusting wheels 23, the bearing blocks 19 and the idler pulley 17 may be moved to and from the driving pulley 14 and shaft 15, in order to place the desired amount of tension in the conveyor or feed belt 13. After the required adjustment has been made, the parts are held in such adjusted position by lock nuts 24 threaded on the rods 22 and adapted to be clamped against the adjusting wheels 23.

Opposed vertical side belts 25 are also provided in overlying relation to the horizontal feed belt 13 in order to confine the fish fillets YY in their travel toward the extrusion device CC and cut-off knife BB, and also to enable the fillets to be arranged longitudinally and one upon another to a desired height. The side belts are supported or backed up by vertical guide plates 26 extending lengthwise of the machine and engageable with the inner surface of the side belts. These plates are suitably secured with respect to the table 11 by being attached to spaced brackets 31, 38. The belts 25 are rotated by passing around forward driving pulleys 27 and also around rearward idler pulleys 28 arranged to rotate about vertical axes. The forward drive pulleys are affixed to vertical shafts 29 whose upper ends are rotatable within a boss 30 forming the outer end of a bracket 31 secured to the table 11 by cap screws 32 (see Figs. 7 and 8). The shaft extends through a bearing 33 in the upper portion of the table to a location below the table top, where a driven bevel gear 34 is secured to it by means of a key and keyway connection 35 and a set screw 36. The vertical load on the driving pulley is taken by a suitable end bearing 37 engaging the lower end of the pulley 27 and the table.

The vertical idler pulleys 28 are secured on shafts 37 rotatable within movable bracket arms 38 mounted on pivot pins 39 oscillatable in vertical bearing blocks 40 attached to the table top. These arms are movable about their respective pivot pins 39 to vary the distance between the driving and idler pulleys 27, 28, and thereby determine the tension in the side belts 25. The tension of each belt is adjustable by a threaded adjusting rod 41 extending through a fixed nut member 42 formed on the upper end of a bracket 43 secured to the table top. The end of the rod 41 engages the movable bracket arm 38. By rotating the rod, the bracket arm is caused to swing on its pivot pin 39 to suitably tension the side belt 25. After the desired tension has been imparted to the belt, the arm is prevented from swinging toward the driving pulley 27 to slacken the belt 25 by tightening a lock nut 44 threaded on the rod 41 against the fixed bracket nut 42.

The horizontal feed belt 13 and the guiding side belts 25 are driven in the same forward direction at the same linear speed. To accomplish this purpose, the drive is transmitted from a pneumatic feed motor 1 (see Fig. 4), including a double acting cylinder 46 whose head end is oscillatably mounted on a pivot pin 47 secured to the table 11. A piston 48 in the cylinder is attached to a rod 49 extending through the rod end of the cylinder. The rod is conected to a pin 50 extending through the outer end of a pawl holder or arm 51 which is oscillatably mounted upon one end of the shaft 15 to which the driving feed pulley 14 is secured (see particularly, Figs. 4 and 6). A plurality of driving pawls 52 are mounted upon pivot pins 53 secured to the pawl holder 51, and are engageable with the teeth of a ratchet wheel 54 secured to the drive shaft 15. A nut 55 is threaded on the end of the shaft to hold the parts in proper assembled relation. The pawls 52 are spaced from one another in such manner that only one of them engages a ratchet tooth at any time. This arrangement reduces the amount of lost motion before one of the pawls will engage the ratchet teeth during a power stroke of the driving mechanism 45.

When air enters the head end of the feed motor cylinder 46, the piston 48 is moved in a forward direction to cause one of the pawls 52 to engage the ratchet wheel 54 and rotate the drive shaft 15 and driving pulley 14 to a predetermined extent. The feeding of air into the rod end of the cylinder 46 causes the piston to retract without rotating the drive shaft 15, in view of the one-way driving characteristics of the pawl and ratchet device 52, 54.

It is evident that angular movement of the drive shaft 15 and drive pulley 14 will move the conveyor feed belt 13 in a forward direction by a predetermined amount. Such motion of the drive shaft is also imparted to the drive pulleys 27 for the side belts 25 to move them in the same direction, at the same speed and at the same time.

Thus, a driving sprocket 56 is keyed on the end of the drive shaft 15, and is prevented from axial movement by means of a nut 57 threaded on the end of the shaft. An endless chain 58 passes over the drive sprocket and over a driven sprocket 59 keyed to a shaft 60 rotatably mounted in bearing supports 61 formed in the table 11 below its top portion. Driving bevel gears 62 are affixed to this shaft by keys 63 and set screws 64, the gears meshing with the driven bevel gears 34 secured to the vertical driving pulley shafts 29 (see Fig. 7).

The driving bevel gears 62 face in opposite directions, and mesh with the driven bevel gears 34 on opposite sides of the axes of the vertical shafts 29, in order to rotate the vertical shafts 29 in opposite directions, and thereby feed the vertical side belts 25 in the same direction. The diameter of the driving pulley 14, and the diameter of the vertical feed drive pulleys 27 and ratio of the gearing 56, 58, 59, 60, 62, 34 is so selected that the pulleys 14 and 27 rotate together at the same linear speed.

Tuna fish YY, or other fish fillets, are placed upon the feed belt 13, and are conveyed toward the extrusion device CC, which lies transversely of the direction of movement of the feed belt. This extrusion device includes a horizontal extrusion or compression chamber 65 extending completely across the feed belt 13, and having an entrance opening or inlet 66 in alignment with the feed belt (see Figs. 3, 9, 10). The extrusion chamber 65 is of generally rectangular cross-section, including a main body portion 67 of generally U-shape, secured to the table top by cap screws 68, or the like (Fig. 1). The entrance 66 into the chamber is defined by closure plates 69 closing the U-shaped body 67 on opposite sides of the entrance, these plates being secured to the body by cap screws 70. At the opening 66, the base of the extrusion chamber is omitted to permit passage of the feed belt 13 through the lower portion of the extrusion chamber 65 along the top of the table 11 (see Figs. 3, 9, 10).

The fish YY is fed into the entrance 66 by the conveyor belt 13. In passing toward this entrance, the fish moves under a horizontal compacted roller 71 (Fig. 1) adapted to engage the upper portion of the fish YY and press it downwardly to insure its passage into the entrance opening. This compacting roller may be suitably supported, as by having its trunnions 72 rotatable within the bracket 31 for the vertical drive pulley shafts 29.

The fish is fed by the conveyor belt 13 through the entrance opening 66 in the extrusion chamber 65 until it engages the back wall of the latter, whereupon feeding of the conveyor belt 13 ceases. Thereafter, the mass of fish in the chamber is severed from the remaining fish fillets on the belt that have not as yet been moved into the chamber.

The severing device BB includes a supporting bracket 73 extending upwardly from and secured to the upper end of the extrusion chamber 65 by cap screws 74 (Figs. 1, 3, 9, 10). This bracket has vertical guides 75 on its ends, in which a vertically movable knife 76, or shearing blade, is reciprocable across the face of the entrance 66. The upper end of the knife blade is secured to a head 77 by screws 78, or the like, this head being attached to a piston rod 79 extending upwardly into a cut-off motor 2, including a double acting cut-off cylinder 80, in which it is attached to a piston 81. Air is fed selectively to each end of the cylinder 80, in order to effect movement of the piston 81 either in a forward or downward direction, or in an upward or retracted direction.

During downward movement of the cutoff knife 76 to sever the mass of fish in the extrusion chamber 65, the cutting or shearing action is facilitated by a pressure device brought to bear upon the fish externally of the extrusion chamber. This pressure device includes a pressure pad 82 extending across the conveyor belt 13 immediately before the opening 66 and adjacent the outer surface of the cut-off knife. The pad 82 is attached to opposed guide rods 83 extending upwardly through guiding bosses 84 secured to or integral with a cross-piece 85 attached to the upper end of the knife by screws 86. The pressure pad 82 is urged in a downward direction relative to the knife blade 76 and its cross-piece 85 by compression springs 87 encompassing the guide rods 83, with their lower ends bearing upon the pressure pad 82, and with their upper ends bearing against the cross-piece.

Assuming that the fish YY has been fed through the entrance opening 66 into the extrusion chamber 65, air is fed into the upper end of the cut-off cylinder 80 to move the piston 81 and knife 76 downwardly. This downward movement causes the pressure pad 82 to engage the fish and compact it to the extent determined by the force of the springs 87. Following its compacting, the knife blade 76 can continue its downward movement, because of the yieldability of the springs 87, the blade effecting severing of the mass of fish in the extrusion chamber 65, and being disposed completely across the entrance 66 to serve as a closure during the movement of the fish mass within the extrusion chamber itself, as described below.

A ram or plunger 88 (Fig. 3) is movable through the extrusion chamber 65 behind the fish mass to force it progressively into forming pockets 89 in the periphery of the turret wheel 90 of the turret mechanism DD. The ram is urged towards the latter mechanism by an extrusion motor 3, which consists of a double-acting cylinder 91 secured to the end of the extrusion chamber 65. The cylinder 91 contains a piston 92 to which a rod 93 is secured. This rod extends from the extrusion cylinder 91 into the extrusion chamber 65, where it is connected to the ram or plunger 88.

When air is caused to enter the head end of the extrusion motor 3, the piston 92 is moved forwardly, causing the ram 88 to force the fish toward the turret mechanism DD. When air is caused to enter the rod end of the extrusion motor 3, the piston 92 and ram or plunger 88 are retracted.

The outlet end of the extrusion chamber 65 is secured to the housing 94 of the turret forming mechanism DD by cap screws 95, or the like. The compacted or compressed fish is forced by the ram 88 into the generally radial forming pockets 89, which are spaced equiangularly about the periphery of the wheel or turret 90 disposed in the forming housing 94.

As disclosed in the drawings, provision is made for four forming pockets 89 displaced by ninety degrees with respect to each other. It is, of course, apparent that the number of forming pockets and their spacing can be varied, if desired.

The forming wheel 90 is keyed, or otherwise suitably affixed, to a shaft 96 rotatably supported in opposed bearing supports 97 provided in the forming housing 94 and in a forming housing cover 98, which, together, comprise the enclosure for the turret wheel 90. The main housing portion 94 and its cover 98 are suitably affixed to the supporting frame 10, as by the use of cap screws 99. Together they slidably engage the side faces 90a of the forming wheel 90, in effect furnishing end closures for the forming pockets 89, in order to prevent inadvertent loss of compressed fish therein.

The shaft 96 extends in one direction from the forming cover, where an indexing plate 100 is attached to it, in order to register appropriately the pockets 89 with the extrusion chamber 65, and also with a forming head or die 101 slidably mounted in the upper portion of the forming housing 94, and movable vertically in forming the fish mass into the desired cylindrical contour.

The compressed fish passes from the extrusion chamber outlet 65a through an opening 102 in an arcuate cut-off knife 103 of the cut-off device EE, which is movable across the extrusion chamber. The cut-off knife 103 is movable along a path parallel to the axis of the forming wheel 90, and has its inner surface 103a curved to form a continuation of the periphery of the forming wheel or disc 90. The rear portion of the cut-off mechanism EE includes the knife 103 just referred to, which is longer than the width or thickness of the wheel 90, so as to completely cover each forming pocket 89. It also extends arcuately a greater distance than the arcuate extent of the open end of each forming pocket 89, in order to insure closing of the pocket and full severing of the fish mass in the pocket from the compacted fish at the outlet portion 65a of the extrusion chamber.

The arcuate knife blade 103 is attached to a pair of horizontal, vertically spaced guide bars 104 secured at their forward end to a plate 105, and at their rearward end to a head 106 affixed to a rod 107 extending into the double acting cylinder 108 of an extrusion cut-off motor 4. The cut-off mechanism is guided within vertically spaced horizontal grooves 109 formed between the forming housing 94 and the outlet end 65a of the extrusion chamber. By riding in these grooves 109, the path of travel of the cut-off knife is maintained along a straight line.

When air enters the rod end of the cut-off motor 4, its piston 109 and knife mechanism 103 are retracted, which disposes the opening 102 defined between the cutting edge 103b of the knife blade and the plate 105 in alignment with the extrusion outlet 65a and the forming pocket 89. When air is caused to enter the head end of the cut-off motor 4, the knife blade 103 is advanced, to sever the fish mass in the forming pocket 89 from the fish in the extrusion chamber 65, and also to close both the forming pocket and the end of the extrusion chamber. Thereafter, the turret 90 is moved or indexed ninety degrees, to move the pocket upwardly along the arcuate surface of the forming housing 94 into alignment with the forming head 101.

It is to be noted that the base 110 of the forming pocket 89 is semi-circular in shape, and that the remaining portion of the pocket is defined by parallel surfaces 111 tangent to the semi-circular base. When the fish in the forming pocket 89 has been moved with the wheel 90 into alignment with the forming head 101 at the forming station GG, the latter is caused to move downwardly to further compact the fish into its full cylindrical shape.

Figure 13:
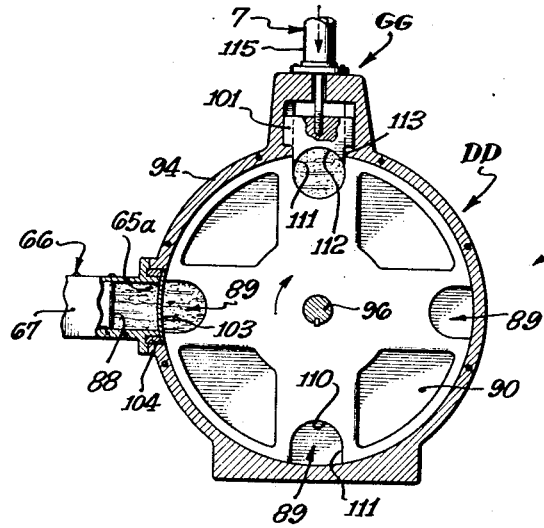
Fig. 13 is a section, on a reduced scale, taken along the line 13—13 on Fig. 12.

In order to accomplish the aforementioned function, the lower end 112 of the forming head is semi-circular, being shaped in opposition to the semi-circular base 110 of the forming pocket 89 (Fig. 13). Moreover, the vertical ends 113 of the forming die are adapted to slide within the parallel sides 111 of the pocket, while the vertical side faces 114 of the forming die are substantially in alignment with the side faces 90a of the turret wheel. As a result, downward movement of the forming die 101, to the extent at which its leading edges substantially coincide with the ends of the semi-circular forming pocket base 110, compacts the fish mass in the pocket 89 into a cylindrical shape having a predetermined diameter. In view of the thickness of the forming wheel 90, or the longitudinal distance across the pocket 89, the fish mass also has a predetermined length.

The forming head 101 is moved to and from the forming pockets 89 in the turret wheel 90 by a forming die motor 7, which consists of a double-acting cylinder 115 attached to the upper end of the housing 94 by screws 116 or the like. This cylinder contains a piston 117 secured to a rod 118 extending through the upper end of the housing and threaded into the forming die 101. When air is fed into the head end of the forming die cylinder 115, the piston 117 is moved downwardly to compact the fish mass in the forming pocket 89 into the cylindrical shape. Entry of air into the rod end of the cylinder effects retraction of the forming die 101.

After the fish mass has been shaped cylindrically by the forming die 101 at the upper end of the turret housing 94, the mass is ejected from the latter into cans 119, or other containers. The ejecting mechanism JJ includes a discharging plunger 120 contained within a cylindrical chamber 121 extending rearwardly from the cover 98 of the forming housing. This plunger 120 is attached to a rod 122 extending into the cylinder 123 of a fluid ejector motor 8. After the fish has been formed, air is fed into the head end of the cylinder 123 to move its piston 124 and the discharging plunger 120 forwardly, which presses the cylindrical mass of fish through a cylindrical guide 125 into a can 119 disposed in alignment with the guide 125, forming pocket 89 and discharge plunger 120. The plunger, of course, has essentially the same diameter as the fish mass and the cylindrical guide 125 so as to insure full ejection of the fish into the open can 119. The feeding of air into the rod end of the ejector motor 8 then retracts the piston 124 and plunger 120 back within the confines of its enclosure 121. When fully retracted, the forward end of the plunger 120 forms a continuation of the inner surface 90a of the housing cover 98.

Figure 14:
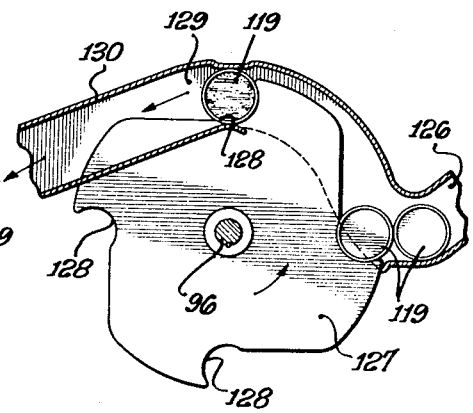
Fig. 14 is a section through the can feeding mechanism, taken along the line 14—14 on Fig. 12.
Figure 21:
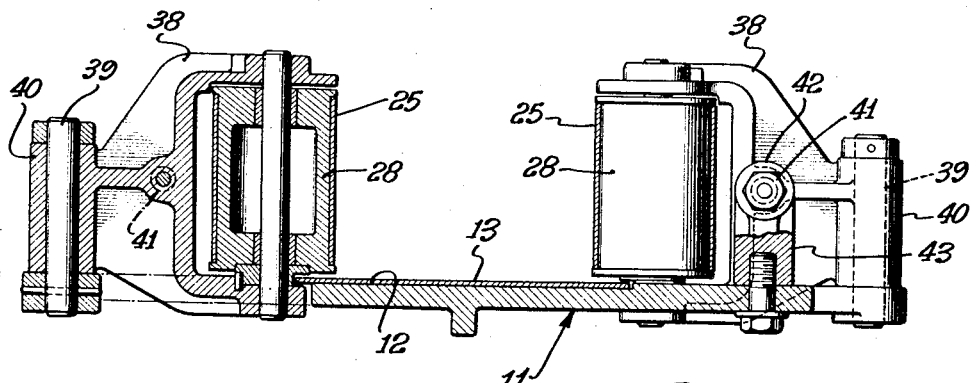
Fig. 21 is an enlarged cross-section taken along the line 21—21 on Fig. 1.
Figure 22:
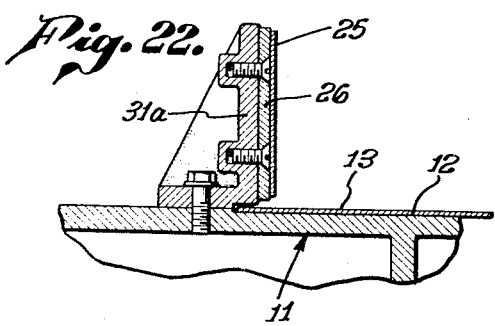
Fig. 22 is a partial cross-section taken along the line 22—22 on Fig. 1.

The cans 119, whose bottoms are closed, are fed through an intake chute 126 (Fig. 14) onto a can indexing wheel 127 attached to the turret wheel shaft 96 on the side of the housing opposite the indexing plate 100. This can wheel 127 has pockets 128 angularly spaced to the same extent as the forming pockets 89 in the forming wheel 90 and in substantial alignment therewith. After the cans move down the intake chute 126, usually by gravity, and are received within a can pocket 128, they are moved with the turret wheel 90 in an upward direction until they are disposed in alignment with the ejector plunger 120 and guide sleeve 125. When in this position, the bottom 119a of each can engages the base of a backing frame 129 suitably secured to the guide sleeve 125, in order to hold the can in position against the force of the plunger 120 when the cylindrical fish mass is placed within the can. Following such placement, rotation of the indexing wheel 127 is continued to effect removal of the can 119 through a discharge chute 130 communicating with the backing frame 129.

The turret wheel 90 and the can indexing wheel 127 are rotated together by means of the indexing mechanism FF, and they are accurately located in alignment with the discharge portion JJ of the apparatus by an index device HH, which also aligns the forming pockets 89 with the extrusion chamber outlet 65a, and with the window or opening 102 in the cut-off knife device.

The indexing mechanism FF (Fig. 3) includes the indexing plate or wheel 100, which is secured to the turret wheel shaft 96. This wheel has peripheral indexing or ratchet teeth 131 adapted to be engaged by a pawl 132 pivotally mounted upon a driving arm 133 oscillatable on the turret wheel shaft 96. In the specific example disclosed in the drawing, four teeth are illustrated spaced ninety degrees apart, so as to conform to the angular spacing of the turret pockets 89 and can pockets 128. These teeth, however, need not be disposed in the same radial plane as the pockets.

The pawl driving arm 133 is moved by a fluid indexing motor 6, which includes a piston rod 134 pivoted to the arm 133 by a suitable pin 135 and attached to a piston 136 within the motor cylinder 137, which is pivoted upon the supporting frame 10 of the apparatus by a suitable hinge pin 138. Entry of air into the rod end of the indexing motor 6 moves the rod 134 downwardly and causes the pawl 132 to engage a ratchet tooth 131 and advance the indexing wheel 100 to rotate the turret and can wheels 90, 127. Entry of air into the head end of the motor 6 moves the rod 134 in the opposite direction, in which it is ineffective to impart reverse rotation to the indexing plate 100, forming wheel 90 and can indexing wheel 127.

The indexing wheel 100 is moved to a predetermined point upon movement of the driving arm 133 and pawl 132 on a power stroke, which is determined by the index device HH. This device includes a locating pin 139 slidable within a bracket 140 attached to the turret housing cover 98 by cap screws 141, or the like. This pin 139 is adapted to be received progressively within holes 142 in the indexing plate 100 extending parallel to its axis. These holes are angularly displaced to the same extent as the forming pockets 89 and can pockets 128. When the indexing pin 139 enters a hole 142, the forming pockets 89 are in alignment with the extrusion chamber 65 and the forming die 101, while the can pocket 128 is in position to dispose a can 119 supported therein in alignment with the ejector plunger 120. In order to facilitate entry of the pin 139 into the holes 142, the exterior face of the indexing plate 100 is grooved, each groove 143 merging into a hole 142, so as to guide the pin 139 into the latter and insure that the plate 100 cannot overrun the pin.

The pin 139 is urged toward the plate 100 and into its holes 142 by a compressed helical spring 144, one end of which engages the supporting bracket 140, and the other end of which engages a flange 145 fixed to the rod or pin 139. Movement of the pin into a hole 142 is limited by engagement of the flange 145 with a bracket lug 140a. The pin is retractable by an index pin motor 5, having a cylinder 146 suitably secured to the bracket 140. This motor has a piston 147 fixed to the pin 139, in order that entry of air into the rod end of the cylinder 146 will retract the piston and the pin against the force of the spring 144. When such retraction occurs, the index motor 6 may be operated to cause the driving arm 133 and pawl 132 to advance the turret wheel 90 and can wheel 127 by a predetermined angular extent. Before full advance has occurred, the air pressure in the rod end of the cylinder 146 is bled off, allowing the spring 144 to urge the pin 139 against the outer face of the indexing plate 100, the pin moving inwardly into a plate groove 143 and then snapping into an index hole 142, thereby accurately locating the forming pockets 89 and can pocket 128.

The various parts of the mechanism are so disposed as to effect their operations at predetermined points and under predetermined conditions. If the conditions are not satisfied, the mechanism will not operate. In general, the feed belts 13, 25 are advanced by the feed motor 1 to move the fish fillets YY through the opening 66 into the extrusion chamber 65. When the feed mechanism or conveyor has so moved to a predetermined extent, the cut-off knife motor 2 is actuated to sever the fish in the chamber 65 from the remainder of the fish on the feed belt 13. In addition, the cut-off knife 76 serves to close the chamber opening 66. Thereafter, the extrusion motor 3 is moved in a forward direction to compress the fish in the extrusion chamber 65 and force it into a forming pocket 89 which has been aligned therewith by the indexing wheel 100. During such alignment, a preceding charge of fish in a forming pocket 89 has been aligned with the forming die 101, and the can pocket 128 has also been aligned with a forming pocket 89 and ram 120. As described above, such aligning functions are determined by the operation of the indexing motor 6 and of the indexing pin motor 5. Following such alignment, the forming die 101 compacts the fish into the cylindrical shape, while the extrusion motor ram 88 forces the fish through the knife opening 102 into the forming pocket 89 in alignment with the extrusion chamber 65.

When the compressive force on the mass of fish in the extrusion chamber 65 and forming pocket 89 reaches a predetermined amount, the cut-off motor 4 is actuated to advance the cut-off knife 103 and sever the fish in the pocket 89 from the balance of the fish in the extrusion chamber ahead of the extrusion ram 88. This severing action also closes the outer end of the pocket 89. The ejector motor 8 is then operated to force the cylindrical quantity of fish out of an upper forming pocket and into a can 119, as described above. Following the completion of this operation, the ejector ram 120 and forming die 101 are retracted, and the turret wheel 90 indexed by the indexing motor 6 and the indexing pin 139 through the required angular extent (ninety degrees) to place the next succeeding forming pocket, with a compacted mass of fish therein, immediately below the forming die 101 and the next empty pocket in alignment with the extrusion chamber 65. The cut-off motor 4 is then retracted to align the knife window 102 with the outlet 65a of the extrusion chamber, whereupon the extrusion ram 88 is actuated again to force the next succeeding mass of fish into the empty pocket.

The control mechanism is so interrelated that the cut-off knife device EE, indexing mechanism JJ, HH, forming die 101 and ejector 120 will only work if the extrusion mechanism CC compacts the fish into a forming pocket 89 with a predetermined force. So long as such force is available, the extrusion motor 3 and its ram 88 will advance intermittently to continue feeding fish into successive empty pockets 89 in the turret wheel 90. If, however, insufficient fish is ahead of the extrusion ram 88 to effect its compacting into the forming pocket with the desired force, the extrusion motor 3 is retracted automatically until its ram 88 is clear of the opening, which action effects elevation of the cut-off knife 76 to a position above the extrusion chamber opening 66. Such elevation effects automatic advance of the conveyor feed motor 1 to feed additional fish on the belt 13 through the opening 66 into the chamber 65. Following such feeding, the knife 76 is actuated, the extrusion motor 3 again advances, and the above-described operations are reinstituted in effecting formation of the fish and its ultimate ejection into cans 119.

The operations described above may be performed by the control mechanism disclosed in Fig. 15, with certain of the parts illustrated in greater detail in Figs. 16 to 20, inclusive. In order to clarify the mode of operation of the device, the various air motors have not necessarily been disposed in the relative positions which they occupy in the actual machine.

The conveyor feed motor 1, the cut-off motor 2 at the inlet 66 to the extrusion chamber 65, the extrusion motor 3, the indexing wheel motor 6, the forming die motor 7 and the ejector motor 8 are all essentially the same. As disclosed in Fig. 16, each motor includes a cylinder 150 with a piston 151 slidable therein for moving a piston rod 152 extending through the rod end of the cylinder. The head end of the cylinder is provided with a control valve device 153 movable transversely of the cylinder axis. This valve device determines the admission and exhaust of air through the head port 154 of the cylinder, and also the admission and exhaust of air into and from the cylinder at the rod end of the cylinder, this latter air passing through a passage 155 extending within and along the cylinder wall from its head end to its rod end.

The main air for moving the piston 151 in the cylinder 150 enters the valve housing 156 through an inlet port 157. This housing contains a slide valve 158 movable across the ports 154, 155 of the cylinder, in order to place such ports either in communication with the housing 156 or with an exhaust port 159 opening outwardly through the valve housing. The slide valve is of generally U-shaped cross-section, and is movable across the ported end of the cylinder 150 by being embraced by flanges 160 provided on a rod 161 extending in opposite directions from the main air chest or housing 156 into cylinders 162, 163, where they are attached to pistons 164, 165 which may carry suitable piston rings 166 for preventing leakage.

Control air may enter either cylinder 162 or 163 to shift the pistons 164, 165 in one direction or the other, and shift the slide valve 158. As disclosed in Fig. 16, the slide valve has been moved to one side of the inlet port 154 by air acting upon piston 164, which permits the main air under pressure to enter the cylinder 150 and move the piston 151 in a forward direction. The other port or passage 155 is communicable, through the hollow slide valve 158, with the exhaust port 159. If control air is allowed to enter the other cylinder 163, it will act upon the other piston 165 and shift it in the opposite direction for the purpose of sliding the valve 158 to a position in which the main air is communicable with the passage 155 leading to the rod end of the piston, thereby retracting the piston 151 in the cylinder 150. The air in the forward part of the cylinder may exhaust through the port 154 and hollow slide valve to atmosphere. From the foregoing it is apparent that valve cylinder 162 determines forward or advancing movement of the fluid motor, and valve cylinder 163 return or retracting movement.

The cut-off motor 4 for manipulating the arcuate cut-off knife 103 is essentially the same as motors 1, 2, 3, 6, 7 and 8. It is illustrated in Fig. 20. Its valve control device is somewhat different in that it is provided with a piston 164 adapted to be acted on by air, as in Fig. 16, for the purpose of shifting the slide valve 158 to a position allowing the main air to enter the head port 154 and move the piston 151 and rod 152 in a forward direction. When the control air in the forward cylinder 162 of the valve is bled off, a compression spring 167 at the other end of the air chamber 156 bears against the rod 161 and shifts the slide valve 158 to its other position, allowing the air on the head end of the piston to exhaust and the main air to enter the rod end of the cylinder 150 through the passage 155 and retract the cut-off knife 103.

Indexing pin motor 5 is a single acting motor of essentially the same type as motor 4 and is controlled by the same valve device as motor 4. The only difference is that air is effective on the rod end of the cylinder only, to retract the piston and the indexing pin 139. When this air is allowed to exhaust to atmosphere, the compression spring 144 shifts the piston and indexing pin 139 in a forward direction.

The air for operating the motors is obtained from a main air supply line 600, whereas the air for performing substantially all of the control functions is obtained from a control air supply line 500. The passage of air to the conveyor feed motor 1 is governed by the position of the cut-off motor 2. Assuming that the conveyor feed motor 1 is retracted, the retraction of the cut-off motor 2 to its fullest extent, in order to open the outlet 66 into the extrusion chamber 65, operates a valve mechanism C, which allows air to pass to the advancing valve side 162 of the control valve of motor 1.

As illustrated in Fig. 15, the control air passes from the main line 500, through the lines 501, 502 and 503, into valve housing C. When the cut-off knife motor 2 is fully retracted, valve C is open, allowing air to flow through line 504, and through a manual control valve V into line 505, and into and advancing end 162 of the valve device, shifting the valve device downwardly, as seen in Figs. 15 and 16, to exhaust the rod end of the motor cylinder and to allow the main air supply to enter the head end of the cylinder. This main air flows through the main line 600 and through the lines 610 and 611 into the air chamber 152, then passing through the inlet port 154 into the cylinder 46, forcing the piston 48 and rod 49 in a forward direction, causing the pawl and ratchet device 52, 54 to advance the belt conveyor 13, 25 by a predetermined amount.

The type of control valve C is disclosed in Fig. 17. It includes a push rod 170 extending from the exterior of the valve housing 171 into its interior, where it is provided with flanges 172 embracing a slide valve 173, in order to selectively shift the valve in opposite directions. Air pressure originating in the control line 500 acts upon the rod 170 within the housing and always tends to urge it in an outward direction, which shifts the slide valve 173 to the left (as seen in Fig. 17), or to the right when the valve is positioned in the same manner as valve C in Fig. 15. Outward movement of the valve rod 170 shifts the head 173 to prevent the lines 503 and 504 from communicating with each other, the line 504 exhausting to atmosphere through the port 174. When the rod 170 is pressed inwardly, the slide valve 173 is shifted to place the lines 503 and 504 in communication with each other, in order that air will flow into the valve cylinder 162, to shift the slide valve 158 and cause the conveyor feed motor 1 to advance, in the manner described above. The port 175 disclosed in Fig. 17 is not used in valve C, being closed by a suitable plug.

Similarly, movement of the knife motor 2 in a forward direction to its fullest extent causes the rod 170 of valve D to be actuated, which places the retracting end 163 of the valve control device in communication with the control air. Valve D is of essentially the same construction as valve C, inward movement of its rod or plunger 170 allowing air to pass through the lines 500, 501, 502, 503a and through the valve D to the line 506, which shifts the control valve 153 to a motor retracting position, allowing the main air in the line 611 to pass through the passageway 155 to the rod end of the cylinder, thereby retracting the conveyor feed motor 1.

Movement of the cut-off knife motor 2 and also of the extrusion motor 3 is interrelated with the position of the belt feed motor 1. Air may be fed to the advance end 162 of the control valve of cut-off motor 2 from the lines 500, 507, 508, valve B and line 509. The air to the retracting side 163 of the control valve of motor 2 flows through lines 500, 507, 508, valve B and line 510. The ability of air to pass to either side of the control valve 153 is dependent upon the position of valve B.

Air to the advancing side 162 of the control valve of the extrusion motor 3 flows through lines 500, 507, 511, valve A, line 512, valve E and line 513. Air to the retracting end 163 of the valve mechanism of motor 3 flows through lines 500, 507, 511 and 512 to valve E, from which it flows through line 514.

Valves B and E are of the same general type as the control valves 153 of motors 1, 2, 3, 6, 7 and 8. As disclosed in Fig. 18, the air can enter the valve chamber or housing 156a, with air being able to flow selectively through one of two ports 176, 177. When air can flow from the air supply port 178 to one of the ports 176 or 177, the valve head 158a has been shifted so that the other port 177 or 176 communicates with the exhaust port 159a, and vice versa.

The positions of valves B and E and the passage of air to valve E is dependent upon the position of valve A, which is controlled by the conveyor feed mechanism. The valve A is of the same general type as valves C and D, except that it does utilize the port 175 (Fig. 17). When its plunger is in an outward direction, which is the position it occupies upon retraction of the conveyor feed motor 1, air is permitted to flow through the valve A from the line 511 to line 512, which supplies valve E with air. When the conveyor feed motor 1 advances to its fullest extent, a projection 178 on the pawl lever or arm 51 engages the rod 170, pushing it inwardly, which exhausts the air from the valve E chamber through the line 512, but allows air to flow from the line 511 into the lines 700 and 701 communicating with one of the pistons 164a of the valve B, shifting the valve in one direction, as to the right, as seen in Fig. 15.

Air can also flow from the line 700 through the line 702 for action upon the left piston 164a of valve E, shifting it to the right. When these pistons are shifted to the right following the full advance of the conveyor feed motor 1, air can enter the advancing end 162 of the cut-off motor 2 valve through the line 509, which causes the cut-off knife 76 to advance and sever the fish in the extrusion chamber 65 from the remaining fish on the feed belt 13. Air line 512 to valve E, however, is closed because the plunger 170 of valve A has been shifted to the right; so that no motion of the extrusion motor 3 occurs at this point. The extrusion motor 3 will only be actuated after the cut-off knife 76 has been fully advanced to close the extrusion inlet 66, which actuates the valve D and effects retraction of the conveyor feed motor 1. When this feed motor retracts, the air in the valve A shifts the plunger 170 outwardly to allow air to flow from lines 500, 507, 511 through valve A and line 512 to valve E. Since valve E has previously been shifted to the right, the air can pass through line 513 to the motor advancing end 162 of the valve control on motor 3, which then allows the main air to flow through lines 600, 601, valve R, and line 613 into the head end of the extrusion motor 3, and advance it and its ram 88 in a direction in which the fish is compressed in the extrusion chamber 65 and forming pocket 89.

Valve A determines the shifting of valves B and

E to the right. Plunger valves F and G, which are essentially the same as valves C and D, determine the shifting of valves B and E to the left. When these latter valves are shifted to the left, air will enter the retracting side 163 of the control valves of motors 2 and 3 and effect their retraction. The shifting of valve B to the left is determined by valve F and can only occur upon full retraction of the extrusion motor 3. On the other hand, the shifting of the valve E to the left is governed by valve G, which is actuated by the extrusion motor 3 when it has been fully advanced.

Air can enter the left side of valve B by flowing through lines 500, 501, 800, 801, valve F and line 802. When the extrusion motor 3 is in fully retracted position, a projection 179 on the plunger 88 or motor rod engages the plunger rod 170 of valve F, shifting it to the left and allowing air to flow from line 801 to line 802, in order to shift the valve B to the left. This allows control air to flow from line 508, through line 510 to the retracting side 163 of cut-off motor 2 control valve, whereupon main air can enter, through lines 600, 610 and 612, the rod end of the motor 2 to shift the cut-off knife 76 upwardly to retracted position.

After the extrusion motor 3 has moved forward to its full permissible extent, the projection 179 and the mechanism associated with it shifts the plunger 170 of valve G to the right, establishing air communication to the left side of valve E through the lines 800, 803, valve G and line 804. The air then shifts valve E to the left, and, since the valve A plunger 170 is disposed to the left, air can flow through lines 500, 507, 511, 512, valve E and line 514 to the retracting end 163 of the motor 3 valve control, causing the extrusion motor to retract fully, since the main air can now flow through lines 600, 601, a solenoid operated valve R and line 613 into motor 3.

As soon as the extrusion motor 3 begins to advance, valve F is closed, bleeding off the right side of valve B and allowing it to shift to the right when the conveyor feed mechanism 178 again actuates valve A. Similarly, as soon as the extrusion motor begins its retracting stroke, valve G is closed and bleeds off the right side of valve E, allowing the latter to be shifted to the right when the conveyor feed mechanism moves the rod 170 of valve A to the right.

From the foregoing description of the control system, it is evident that the conveyor feed motor 1 can only be advanced after the extrusion motor 3 and cut-off knife motor 2 have been fully retracted. Similarly, the extrusion knife motor 2 can only advance after the conveyor 13 has been moved to a predetermined extent and has come to rest. The extrusion motor 3 can only be advanced after the cut-off motor 2 has effected the fish severing operation and has moved the knife 76 to a position fully closing the inlet 66 to the extrusion chamber 65.

The extrusion motor 3 is actuated by air entering through the lines 600, 601 and 613 at a predetermined pressure, which may be selected to any desired value, depending upon the extent of compacting to be imposed upon the fish in the extrusion chamber 65. When this degree of compacting or compression has been reached, the air is bled off from the head end of the extrusion motor cylinder 91; so that the extent of compacting is not exceeded and is held to this predetermined amount. In order to accomplish this purpose, the main air supply to the extrusion motor 3 is determined by a solenoid operated valve R, whose circuit is under the control of a pressure operated switch W.

The solenoid valve R is illustrated in Fig. 19, in which it is seen that air from the line 601 can enter the valve chamber 180 and will pass through a port 181 connected to line 613, or into a port 182 communicating with line 602 leading to the control mechanism for the arcuate cut-off knife motor 4. The slide valve 183 in valve R is shiftable by moving a rod 184 whose ends extend through holes or guides 185 in the wall of the valve chamber 180. This rod is moved in one direction or the other by a yoke 186 depending from a plunger 187 extending in opposite directions through two solenoid coils 188, 189. When the left solenoid coil 188 is energized, current passing through it draws the plunger 187 to the left and shifts the slide valve 183 in the same direction, allowing air to flow from line 601 to line 613 and into the extrusion motor 3. At this time, the valve control 153 for extrusion motor 3 is in the motor advancing position, air entering the head end of the cylinder 91 and moving the piston 92 and extrusion plunger 88 forwardly.

As the plunger compacts the fish in the extrusion chamber 65 and in the forming pocket 89, the air pressure in the cylinder 92 and valve chamber increases, this air pressure passing through the line 614 to the pressure switch W. When the air pressure increases to a predetermined amount, the pressure switch W closes, completing a circuit through the right solenoid coil 189 of valve R, shifting the slide valve 183 to the right and exhausting air from the extrusion motor 3 and the line 613, thereby preventing any additional compacting force from being imposed upon the fish in the extrusion chamber 65 and forming pocket 89. When this degree of compacting has been reached, the cut-off motor 4 is actuated. Actuation of this motor is determined by both the position of the slide valve 183 in valve device R and by the position of control valve S. Air to this latter valve passes from valve R through line 602.

Control valve S is of the same general type as control valves B and E, except that the left lower port 176 is plugged. That is, when air enters its left end, its valve head 158a is shifted to the right and when air enters its right end, its valve head is shifted to the left. When shifted to the left, air can pass through the lines 600, 601, valve R, line 602, valve S, and through the line 603 to the advancing end 162 of the control valve for cut-off motor 4. When shifted to the right, air is bled off from the advancing end of the valve, allowing the spring of motor 4 to shift the valve 158 in the opposite direction and allow the main air from the line 601 to pass through the line 614 and retract the cut-off knife 103.

Passage of air to the right end of valve S is determined by a solenoid operated valve Q, which may be identical to valve R, except that its left port 182 is plugged. This valve Q is connected to the main air line 600 through the line 615. Air may pass through this valve and then flow through the line 616 to the right end of valve S. Whether or not such flow of air can occur depends upon the position of the solenoid plunger 187 in valve Q. Coils 188, 189 of valve Q are connected in parallel with the corresponding coils of valve R so that both of the slide valves 183 in valves Q and R move in the same direction at the same time.

Current may pass from a suitable source to the left solenoid coil 188 of valve Q through the conductors 900, 901, then flowing through the coil 188 and through the conductors 902 and 903 to a switch H, which is normally open and which can be closed only upon movement of the arcuate cut-off knife 103 in a retracting direction. When switch H is closed, the circuit through the left solenoid of valve Q is completed through the conductors 904 and 905. Similarly, the left coil 188 of valve R is energized when switch H is closed, the current passing through the conductors 900, 906, through the left coil of valve R, and through conductors 907, 903 through the switch H, from which the current flows through the conductors 904, 905, thus completing the circuit.

The circuits through the right solenoid coils of valves Q and R are determined by closing of the pressure actuated switch W. When this switch is closed by air pressure of predetermined magnitude in the extrusion motor 3 and line 614, the circuit through the right coil 189 of valve Q is completed through conductors 900, 901, the right coil 189, conductors 908, 909, switch W and conductor 905. Current through the right coil 189 of valve R passes from leads 900, 906, through the right coil 189, lines 910, 909, switch W and lead 905.

As stated above, the circuits through the right coils 189 of valve Q and R are completed by the closing of the pressure switch W. The circuits through the left coils 188 of valves Q and R are completed by closing of the switch H upon retracting movement of the cut-off motor 4 and the knife 103 connected thereto.

It has already been stated that the building up of the predetermined amount of pressure in the extrusion motor 3 closes the switch W and completes the circuits through the right coils 189 of valves Q and R, moving their respective slide valves 183 to the right, which exhausts the right side of valve S and also exhausts the air from the extrusion motor 3. As a result of this movement of the valve R slide valve 183, the line 602 leading to the valve S is placed in communication with air in the lines 600, 601, the previous left positioning of the valve S allowing this air to flow through the latter and through the line 603 into the advancing end 162 of the valve for motor 4. The main air then passes through the line 614, into the head end of motor 4, advancing the arcuate cut-off knife 103 and severing the fish which has been compacted by a predetermined pressure or force from the other fish in the extrusion chamber 65. The cut-off knife 103 will only be actuated in an advancing direction when the pressure switch W has been closed, in accordance with the exertion of a predetermined pressure or force on the extrusion motor 3 and ram 88 secured to it.

After the arcuate cut-off motor 4 and its associated knife 103 have been advanced, the indexing mechanism FF is operated. Its operation is under the control of a valve system now to be described.

Air for retracting index pin motor 5 passes through line 604, into the valve U controlling the flow of air, through the line 605 to the rod end of motor 5. Passage of air to this end is dependent upon the movement of the piston 164 in valve U against the action of the return spring 167 (Fig. 20). The control air for the valve U passes through lines 500 and 515 to the valve I, from where it flows through line 516 to the valve L. From valve L the air passes through the line 517 to valve T, and from valve T through line 518 to valve U. Valves I and L are plunger types of valves like valve A, while valve T is a piston type of valve like valve S. When the plungers 170 of valves I and L are shifted to the right, and when valve T is in its left position, air can flow through the lines just mentioned to the valve U, opening the latter valve to the passage of air to the line 605, in order to retract the indexing pin 139 against the force of the compressed spring 144. Valve T is movable to the left when the cut-off knife mechanism EE is free from engagement with the plunger 170 of valve I, air flowing from the line 515, through the valve I and through the line 550 to the right end of valve T, in order to shift it to the left.

The valve L plunger 170 is engaged by the plate indexing or rotating mechanism FF to shift the valve L to the right and allow air to flow through the line 517 to the valve T. When the indexing mechanism or motor 6 is moved in a direction to advance the indexing wheel, the plunger of valve L is released, which discontinues the application of air to line 517 and valve T, and allows air to flow through line 515, valve I, line 516, valve L and line 551 to the left end of valve T, shifting this valve to the right and bleeding line 518, which allows the spring 167 to shift valve U in a direction bleeding line 605 and allowing the spring 144 to move the indexing pin 139 back against the indexing plate 100.

The flow of air to indexing motor 6 is determined by valves K and J, both of which are of the plunger type. Valve K is similar to valve C, while valve J is like valve A. When the pawl or driving arm 133 of the indexing mechanism is rocked fully to the left, as seen in Fig. 15, to advance the indexing plate 100, it engages the plunger 170 of valve K, allowing air to pass from the lines 500, 519, through valve K and through the lines 522 and 523 to the control valve of motor 6. This control valve of motor 6 is inverted with respect to the showing of the control valves of motors 1, 2, 3, 7 and 8. That is, air entering its lower end, as seen in Fig. 15, will actuate the control valve mechanism 153; so that the main air entering the motor 6 through lines 600 and 620 will advance the indexing motor. When the control valve 153 is moved in a downward direction, the main air will enter the rod end of motor 6 and retract the indexing motor. During the retracting movement, the driving arm 133 and its pawl 132 advance the indexing plate 100.

When indexing motor 6 moves in an advancing direction or to the right, the plunger of valve K is released, the air pressure in valve K shifting the plunger 170 outwardly to bleed the lines 522 and 523, the air then flowing through line 520 to valve J. When the indexing pin 139 is retracted, it engages the plunger of valve J, which allows the air under pressure to flow through the line 521 to the other end of the valve chamber 153 of motor 6. This control air, flowing through line 521, then shifts the control valve 153 of motor 6 and allows air in the line 620 to enter the rod end of motor 6 and shift the pawl arm 133 and pawl 132 in the plate advancing direction.

The coordinated operation of index pin motor 5 and of index plate motor 6 may now be described. As the arcuate cut-off knife 103 advances, the index pin 139 is located within one of the holes 142 in the index plate 100, in order to accurately align the forming pockets 89 with the extrusion chamber 65 and forming die 101, and the can pocket 128 with the ejector ram 120. When the cut-off knife 103 completes its forward stroke, it engages the plunger 170 of valve I, shifting the valve I to the right and allowing air to flow through the line 516 to the valve L. The plunger 170 of valve L has already been shifted to the right by the pawl arm 133 of the indexing device FF. Accordingly, air can flow from the valve L, through the line 517, to the valve T. Previously, during the time that the plunger 170 of valve I was not engaged by the cut-off knife 103, the valve I permitted air to flow from the line 515 to the line 550, into the right end of valve T, to shift it to the left. Accordingly, air can now pass through line 518, to valve U, shifting valve U in a direction allowing air to flow from line 604 to line 605, and to the rod end of index pin motor 5. The piston 147 and index pin 139 are retracted against the compression spring 144, until a projection 190 on the index pin 139 engages the plunger 170 of valve J, allowing communication between line 520 and line 521 leading to motor 6. Since the motor 6 is in its fully advanced position at this time, the driving arm 133 does not engage the plunger of valve K, which is disposed to the right and allows air to flow from line 519, through valve K, to line 520. Since the retracting movement of the index pin 139 has shifted the plunger 170 of valve J to the left, the air can flow from the line 520, through line 521, to the retracting end 163 of the valve device 153 of motor 6. The main air then flows through line 620 to the rod end of motor 6, retracting its piston 136 and moving the pawl driving arm 133 to the left.

As soon as the pawl driving arm 133 is disengaged from the plunger 170 of valve L, which occurs after a slight angular advance of the index plate 100, the rod 170 of valve L is shifted by the air pressure in the valve to the left, which establishes communication between lines 516 and 551, running to the left side of valve T. Since the cut-off knife 103 has shifted the plunger of valve I to the right, line 550 has been exhausted to atmosphere, allownig the air under pressure in line 551 to shift valve T to the right. The shifting of this valve to the right bleeds or exhausts line 518 running to valve U, allowing its spring 167 to shift the valve U in the opposite direction to exhaust line 605. Exhausting of this latter line allows the index pin spring 144 to shift the pin 139 back against the plate 100. Since the plate has not advanced fully to the next indexing position, the pin 139 merely rides along the flat surface of the plate while the index motor 6 fully advances the plate, during which movement the pin will ride into a groove 143 and into the next succeeding hole 142. When the indexing pin moves into the hole, it is disengaged from the plunger 170 of valve J, allowing this plunger to move outwardly and exhaust line 521. At the same time, the indexing motor 6 has been retracted to its fullest extent, which causes the driving arm 133 to shift the plunger 170 of valve K to the left, placing the air line 519 into communication with air lines 522, 523, which causes the valve control of motor 6 to shift in the opposite direction and motor 6 to advance. During the advancing movement of motor 6, the index plate 100 is not actuated, since the pawl 132 merely rides over its peripheral portion.

The shifting of the plunger 170 of valve K to the left also allows air from line 519 to flow through lines 522 and 524 to the advancing end 162 of the valve device 153 of forming die motor 7. The forming die 101 advances or moves downwardly to compact the fish in the pocket 89, which has been aligned therewith previously by the index pin 139. Air to the forming die motor 7 passes from the main line 600 through the line 621.

The position of the forming die 101 controls the ejector motor 8 and also the retracting movement of the forming die motor 7. Air to the ejector motor 8 may pass through lines 500, 525 and 526 to the valve P, from where the air can flow through the line 527 and through a valve N into a line 530 connected to the advancing side 162 of the valve of ejector motor 8. Alternatively, air may flow through lines 500, 525 and 526, through the valve P, into the line 531, from where it passes into valve M, thence flowing through the line 532 to the retracting side 163 of the valve device of ejector motor 8. Air from line 531 may also flow through the valve M, through the line 528, to the retracting side 162 of the valve device for forming die motor 7.

The remainder of the air control system at the lower end of Fig. 15, involving valve O, controls the operation of cut-off motor 4 by determining the shifting of piston valve S. Air may pass through the lines 500, 525, 533, to the valve O, and from the valve O through the line 534 to the left side of valve S, shifting it to the right and bleeding line 603 and cut-off motor 4.

Valves M and P are of the same type as valve A, while valves N and O are like valve C, in that their plungers 170 are normally forced outwardly by the air pressure in each valve housing. Inward movement of the plungers 170 for valves M and N is effected by a suitable projection 195 on the forming die mechanism 101. When the forming die is in retracted position, the projection 195 engages the plunger or rod 170 of valve M, shifting it to the left. When the forming die is in its advanced position, its projection 195 engages the plunger 170 for valve N. Ejector motor mechanism 8 is also provided with a projection 196 engageable with the plunger 170 of valve O to move it inwardly, upon retraction of the ejector 120, and engageable with the plunger 170 of valve P to move it inwardly, upon advance of the ejector.

Forming die motor 7 and ejector motor 8 are originally in their retracted positions. Forming die motor 7 shifts the plunger 170 of valve M to the left, which prevents passage of air to line 528 leading to the retracting side 163 of the valve device for motor 7. The retracted position of motor 8 shifts the plunger 170 of valve O to the left, and allows air to flow through lines 500, 525, 533, valve O, and line 534, to the left side of valve S, shifting the latter to the right and bleeding off line 603, which allows the spring 167 in the valve device of motor 4 to shift the valve device and effect retraction of the cut-off knife 103. As indicated above, when indexing motor 6 is retracted and shifts the plunger 170 of valve K to the left, air can flow through lines 500, 519, valve K, lines 522 and 524, to the advancing side 162 of the valve device of motor 7, shifting the forming die 101 in a forward direction into a turret wheel pocket 89 and compacting the fish mass therein into its cylindrical shape.

At the end of its stroke, the projection 195 on forming die device 7 engages the plunger 170 of valve N, shifting it to the right and allowing air to flow through lines 500, 525, 526, valve P, line 527, valve N and line 530, to the advancing side 162 of the valve device of ejector motor 8, shifting this motor in a forward direction, to cause the ejector or discharge ram 120 to force the cylindrical mass of fish into the can 119. This forward advance of the ejector motor disengages projection 196 from the plunger 170 of valve O and bleeds or exhausts line 534 leading to the left side of valve S, allowing it to be shifted to the right, depending upon the position of valve Q.

When the ejector motor 8 is at its fullest advanced position, its projection 196 has moved the plunger 170 of valve P inwardly, or to the right, which exhausts the advancing valve side 162 of motor 8, through line 530, valve N and line 529, but which then allows air to pass from lines 500, 525 and 526, through the valve P, to line 531 leading to valve M. Since the plunger of valve M is disposed to the right, the air can pass through valve M and through the line 528 into the retracting side 163 of valve device of motor 7, allowing the main air from line 621 to retract the piston 117 of motor 7 and the forming die 101 from the pocket 89 on the turret wheel 90. Upon full retraction of the forming die, its projection 195 engages the plunger 170 of valve M, shifting it to the left and bleeding the retracting side 163 of motor 7 valve. At the same time, it allows air to pass from line 531, through valve M, through the line 532 running to the retracting side 163 of motor 8 valve, which effects shifting of the ejector ram 120 in a retracting or reverse direction.

A cycle of operation of the entire system may now be traced by referring to Fig. 15. Let it be assumed that motors 1, 2, 3, 4, 7 and 8 are retracted and that motors 5 and 6 are advanced or extended; manual control valve V is closed; piston valves B, E, S and T are at the left; solenoid valves Q and R are at the left; and pressure switch W is open. Since motor 2 is in the retracted position, valve C is open, which allows air under pressure to be conducted to the inlet side of valve V through lines 500, 501, 502, 503, valve C and line 504. Upon shifting of valve V to open position, air will enter line 505 and effect shifting of feed motor 1 in an advancing direction to operate the conveyor belts 13, 25. At the completion of the stroke of motor 1, valve A is shifted to the right, which allows air to shift valve B to the right through lines 700, 701, and also shifts valve E to the right through lines 700, 702. The shifting of valve B to the right allows control air to enter the advancing side 162 of cut-off knife motor 2 through lines 500, 507, 508, valve B and line 509. At the commencement of the advance of motor 2, valve C closes, bleeding the advancing valve end 162 of motor 1. Complete advancing of motor 2 opens valve D, which allows air to flow through lines 500, 501, 502, 503a, valve D and line 506, to effect retraction of motor 1.

At the start of its retraction, motor 1 allows plunger valve A to shift to the left, which allows the control air supply to flow to the valve E through lines 500, 507, 511, valve A and line 512. Inasmuch as valve E has previously been shifted to the right, the air can flow through valve E and through line 513 to the advancing side 162 of extrusion motor 3. As a result of shifting valve E to the right, the retracting side of motor 3 has previously been exhausted through line 514.

Solenoid valve R is at the left, which allows air to flow from the main line 600, through the line 601 and through valve R into the line 613, which moves the extrusion motor 3 in a forward or advancing direction, effecting compacting of the fish in the extrusion chamber 65. As the motor 3 advances, its air pressure rises to a sufficient extent, acting through line 614 to close the pressure switch W. Such closing completes the circuits through the right solenoids 189 of valves Q and R, shifting their valves 183 to the right and exhausting or bleeding the air pressure on motor 3 through the line 613. Shifting of valve Q to the right bleeds the right side of valve S, which is now supplied with air from line 601, through the valve R and line 602. Since valve S is at the left, air can then flow from line 602, through the valve S, to line 603 to effect the advancing movement of cut-off motor 4. At the end of its stroke, cut-off motor 4 shifts valve I to the right, allowing air to flow to valve U through lines 500, 515, valve I, line 516, valve L, line 517, valve T and line 518. The left side of valve T has been bled through line 551 and through valve L.

Motor 5 is retracted against the force of its compression spring 144, and, at full retraction, opens valve J, allowing air to flow to the retracting side of motor 6 through the line 521. At the start of the retraction of motor 6, valve L shifts to the left, bleeding valve T through line 517 and also bleeding valve U through line 518. The bleeding of valve U causes the spring 167 to exhaust motor 5 through line 605, allowing the spring 144 to shift the index pin 139 against the index plate 100. When this occurs, valve J recloses, bleeding the retracting side of motor 6 valve, which still remains in position to allow air to enter motor 6 through line 620, to effect full retraction of motor 6. Upon its full retraction, motor 6 shifts the plunger 170 of valve K, which allows control air to enter the advancing side 162 of motor 6 valve through lines 522 and 523. When motor 6 is fully advanced, it again shifts valve L to the right and allows the valve T to be pressured through the line 517. Valve T, however, is in the right position, bleeding the valve U through line 518.

At the same time that motor 6 advances, forming die motor 7 also advances, since air can enter its control valve 153 through lines 522 and 524. Full advance of motor 7 causes it to open valve N, allowing air to flow to the advancing side 162 of motor 8 through lines 525, 526, valve P, line 527, valve N and line 530. Full advance of motor 8 shifts the valve P plunger 170 to the right, allowing air to flow from the valve P through line 531, and through valve M and line 528, to retract motor 7. When motor 7 retracts, it shifts valve M to the left, which then allows air in line 531 to pass through valve M into line 532, to effect retraction of motor 8. When motor 8 retracts, it opens valve O and allows air to flow through line 534 to valve S, shifting this valve to the right, which bleeds the advancing valve portion 162 of cut-off motor 4. The spring 167 shifts this valve, causing the air in line 614 to retract motor 4. As motor 4 retracts, a projection 200 on the cut-off knife device engages the switch H and closes it, to energize the left solenoids 188 of valves Q and R, and effect shifting of these valves to the left. Such shifting of valve Q shifts air relay S to the left, but the left shifting of valve R closes the lines 602, which depressurizes valve S.

Extrusion motor 3 again advances, compacting the fish in the extrusion chamber 65 and forming pocket 89, and the foregoing cycle of operation of the motors 4 to 8, inclusive, is repeated. Such repetition will occur until extrusion motor 3 makes a full advance to shift valve G to the right, which allows air to flow through line 804 and shift valve E to the left, which causes air to flow through line 514 to the retracting side 163 of motor 3 valve. This produces full retracting movement of the motor 3. When this occurs, valve F is opened which causes control air to move through line 802 to the right side of valve B, shifting it to the left and allowing air to flow through line 510 to the retracting side 163 of cutoff knife motor 2, which retracts fully to elevate the knife blade 76 above the extrusion chamber opening 66. Full retraction of motor 2 opens valve C, and causes feed motor 1 to advance, to shift the conveyor belt 13 and feed additional fish into the extrusion chamber 65. The foregoing complete cycle of operation of all of the fluid motors and valves then reoccurs.

It is, accordingly, apparent that a method and apparatus of canning fish has been devised, which insures the compacting of the fish, prior to its placement into the cans, with a uniform force regardless of the quantity of fish in advance of the extrusion plunger or ram 88. As a result, the masses of fish placed in the cans are all of uniform weight and of essentially uniform appearance. The mechanisms effecting the compacting action directly on the fish all have smooth surfaces, and, therefore, do not perform any tearing action upon the fish mass. Consequently, precooked fish, such as tuna fish and the like, are not disintegrated and remain in a cohesive state.

All operations are automatic, obviating the need for manual handling of the fish after it has been placed upon the conveyor belt. Once the mechanism has been set to perform its operation, it continues to do so, with assurance that only fish of predetermined size, shape and weight will be formed for insertion or ejection into the cans. Since the diameter of each fish mass is preferably less than the inside diameter of the can, scorching of the fish upon subsequent cooking is avoided.

The inventor claims:

1. In a method of canning fish fillets: the steps of piling a quantity of said fillets generally parallel to each other so as to form a series of fillets in transverse arrangement; feeding said fillets in a direction longitudinally of their fibers; severing a mass of fillets from said quantity transversely of their fibers; compacting said mass with a predetermined maximum force applied transversely of said fibers; severing a portion of said compacted mass from the remainder of said mass longitudinally of said fibers; and compacting the remainder of said mass by the application of said predetermined maximum force applied transversely of said fibers.

2. In a method of canning fish fillets: the steps of piling a quantity of said fillets generally parallel to each other; feeding said fillets in a direction longitudinally of their fibers so as to form a series of fillets in transverse arrangement; severing a mass of fillets from said quantity transversely of their fibers; compacting said mass with a predetermined maximum force applied transversely of said fibers; severing a portion of said compacted mass from the remainder of said mass longitudinally of said fibers; compacting the remainder of said mass by the application of said predetermined maximum force applied transversely of said fibers; and repeating the foregoing cycle by severing a portion of fish from said remaining compacted mass longitudinally of said fibers and compacting the mass then remaining by the application of said predetermined maximum force applied transversely of said fibers.

3. In a fish canning apparatus: a fish compacting chamber; means for advancing fish into said chamber; a ram for compacting fish in said chamber with a predetermined maximum force; means for severing a portion of said compacted fish from the remainder of the fish in said chamber; and means for effecting application of said ram against the remaining fish in said chamber with said predetermined maximum force.

4. In fish canning apparatus: a fish compacting chamber having an entrance; means movable in said chamber for compacting fish therein; means for advancing fish through said entrance into said chamber; means at said entrance for severing fish in said chamber from fish on said advancing means; and means for retracting said compacting means upon its movement in said chamber to a predetermined point.

5. In fish canning apparatus: a fish compacting chamber having an entrance; means movable in said chamber for compacting fish therein; means for advancing fish through said entrance into said chamber; means at said entrance for severing fish in said chamber from fish on said advancing means; means for retracting said compacting means upon its movement in said chamber to a predetermined point; and means for effecting retracting movement of said severing means and advancing movement of said advancing means in response to retraction of said compacting means.

6. In fish canning apparatus: a fish compacting chamber; means movable in said chamber for compacting fish therein; and means for releasing said compacting means in response to its exertion of a predetermined maximum force on fish in said chamber.

7. In fish canning apparatus: a fish compacting chamber having an entrance and an exit; means movable in said chamber for compacting fish therein; means for advancing fish through said entrance into said chamber and out through said exit; severing means adapted to be advanced across said entrance; and means for effecting retraction of said severing means from said entrance after movement of said compacting means across said entrance.

8. In fish canning apparatus as defined in claim 7: wherein said severing means is arranged to close said entrance when advanced thereacross.

9. In fish canning apparatus: a fish compacting chamber having an entrance and an exit; means movable in said chamber for compacting fish therein; means for advancing fish through said entrance into said chamber and through the exit; severing means adapted to be advanced across said entrance; means for effecting retraction of said severing means from said entrance after movement of said compacting means across said entrance; and means for effecting movement of said advancing means in response to retraction of said severing means from said entrance.

10. In fish canning apparatus: a fish compacting chamber; a plunger movable in said chamber for compacting fish therein; and means for releasing said plunger upon its exertion of a predetermined maximum force on fish in said chamber.

11. In fish canning apparatus: a fish compacting chamber; a plunger movable in said chamber for compacting fish therein; means for exerting a predetermined force on said plunger; and means for preventing said exerting means from imposing a substantially greater force than said predetermined value.

12. In fish canning apparatus: a fish compacting chamber having an entrance; a plunger movable in said chamber for compacting fish therein; a conveyor movable through said chamber for forwarding fish through said entrance into said chamber; and a knife movable across said opening transversely of the direction of movement of said conveyor.

13. In fish canning apparatus: a fish compacting chamber having an entrance; a plunger movable in said chamber for compacting fish therein; a conveyor movable through said chamber for forwarding fish through said entrance into said chamber; a knife movable across said opening transversely of the direction of movement of said conveyor; and means for operating said plunger, conveyor and knife in a predetermined sequence with respect to each other.

14. In fish canning apparatus: a fish compacting chamber having an entrance; a plunger movable in said chamber for compacting fish therein; a conveyor movable through and transversely across said chamber for feeding fish through said entrance into said chamber; and a knife movable across said opening transversely of the directions of movements of said conveyor and plunger.

15. In fish canning apparatus: a fish compacting chamber having an entrance; means movable in said chamber for compacting fish therein; means for advancing fish through said entrance into said chamber; severing means movable across said entrance; means for progressively advancing said compacting means in said chamber intermittently and in the same direction; and means for effecting retraction of said compacting means upon its advance to a predetermined point.

16. In fish canning apparatus: a forming pocket; a fish compacting chamber having an outlet communicable with said pocket and also having an entrance; means movable in said chamber for compacting fish into said pocket; means for advancing fish through said entrance into said chamber; severing means movable across said entrance; and severing means movable across said outlet.

17. In fish canning apparatus: means providing a plurality of forming pockets; a fish compacting chamber having an outlet and an entrance; means for registering each of said pockets with said outlet; means movable in said chamber for compacting fish into each of said pockets upon its registry with said outlet; means for advancing fish through said entrance into said chamber; severing means movable across said entrance; and severing means movable across each pocket when registered with said outlet.

18. In fish canning apparatus: a rotatable member having a plurality of forming pockets; a fish compacting chamber having an outlet and an entrance; means for registering each of said pockets with said outlet; means movable in said chamber for compacting fish into each of said pockets upon its registry with said outlet; means for advancing fish through said entrance into said chamber; severing means movable across said entrance; and an arcuate knife movable across the periphery of said rotatable member and across each pocket when registered with said outlet.

19. In fish canning apparatus: means providing a plurality of forming pockets; a fish compacting chamber having an outlet and an entrance; means for registering each of said pockets with said outlet; means movable in said chamber for compacting fish into each of said pockets upon its registry with said outlet; means for progressively advancing said compacting means in said chamber intermittently and in the same direction; said advancing means including instrumentalities for preventing said compacting means from exerting more than a predetermined force on fish in each pocket; means for feeding fish through said entrance into said chamber; severing means movable across said entrance; and severing means movable, in response to exertion of said predetermined force by said compacting means, across each pocket when registered with said outlet.

20. In fish canning apparatus: a rotatable member having a plurality of forming pockets; a fish compacting chamber having an outlet and an entrance; means for registering each of said pockets with said outlet; means movable in said chamber for compacting fish into each of said pockets upon its registry with said outlet; means for progressively advancing said compacting means in said chamber intermittently and in the same direction; said advancing means including instrumentalities for preventing said compacting means from exerting more than a predetermined force on fish in each pocket; means for feeding fish through said entrance into said chamber; severing means movable across said entrance; and an arcuate knife movable across the periphery of said rotatable member and each pocket when registered with said outlet.

21. In fish canning apparatus: means providing a plurality of forming pockets; forming means for shaping fish in said pockets; a fish compacting chamber having an outlet and an entrance; means for registering said pockets with said forming means and outlet; means movable in said chamber for compacting fish into each of said pockets upon its registry with said outlet; means for advancing fish through said entrance into said chamber; severing means movable across said entrance; and severing means movable across each pocket when registered with said outlet.

22. In fish canning apparatus: means providing a plurality of forming pockets; forming means for shaping fish in said pockets; a fish compacting chamber having an outlet and an entrance; means for registering said pockets with said forming means and outlet; means movable in said chamber for compacting fish into each of said pockets upon its registry with said outlet; means for progressively advancing said compacting means in said chamber intermittently and in the same direction; said advancing means including instrumentalities for preventing said compacting means from exerting more than a predetermined force on fish in each pocket; means for feeding fish through said entrance into said chamber; severing means movable across said entrance; and severing means movable across each pocket when registered with said outlet.

23. In fish canning apparatus: means providing a plurality of forming pockets; forming means for shaping fish in said pockets; a fish compacting chamber having an outlet and an entrance; means for registering said pockets with said forming means and outlet; means movable in said chamber for compacting fish into each of said pockets upon its registry with said oulet; means for progressively advancing said compacting means in said chamber intermittently and in the same direction;

said advancing means including instrumentalities for preventing said compacting means from exerting more than a predetermined force on fish in each pocket; means for feeding fish through said entrance into said chamber; severing means movable across said entrance; severing means movable across each pocket when registered with said outlet; and means for ejecting fish from each pocket when registered with said forming means.

24. In a method of canning precooked fish fillets: the steps of arranging a quantity of said precooked fillets generally parallel to each other; feeding said precooked fillets in a direction longitudinally of their fibers; severing a mass of precooked fillets from said quantity transversely of their fibers; compacting said severed mass with a predetermined maximum force applied transversely of said fibers; severing a portion of said compacted mass from the remainder of said mass longitudinally of said fibers; and compacting the remainder of said precooked mass by the application of said predetermined maximum force applied transversely of said fibers.

25. In a fish canning machine: a conveyor upon which a mass of fish fillets may be laid; means for advancing said conveyor; means forming a compression chamber transverse to the direction of movement of the conveyor and having an opening opposite the delivery end of the conveyor for the entry of the fish; a cutter reciprocable across said opening; means in the chamber for moving in said transverse direction; and means at the exit end of said chamber for conforming increments of the fish to can proportions.

26. In a fish canning machine: a conveyor upon which a mass of fish fillets may be laid; means for advancing said conveyor; means forming a compression chamber transverse to the direction of movement of the conveyor and having an opening opposite the delivery end of the conveyor for the entry of the fish; a cutter reciprocable across said opening; means in the chamber for moving fish in said transverse direction; a cutter at the exit end of the chamber; and means communicating with the exit end for conforming the cut fish to can proportions.

27. In a fish canning machine: a conveyor upon which a mass of fish fillets may be laid; means for advancing said conveyor; means forming a compression chamber transverse to the direction of movement of the conveyor and having an opening opposite the delivery end of the conveyor for the entry of the fish; a cutter reciprocable across said opening; means in the chamber for moving fish in said transverse direction; means for ejecting the conformed fish; and means responsive to the attainment of a predetermined pressure of the plunger upon the fish for initiating operation of the ejecting means.

28. In a fish canning machine: a conveyor upon which a mass of fish fillets may be laid; means for advancing said conveyor; means forming a compression chamber transverse to the direction of movement of the conveyor and having an opening opposite the delivery end of the conveyor for the entry of the fish; a cutter reciprocable across said opening; means in the chamber for moving fish in said transverse direction; a cutter at the exit end of the chamber; means communicating with the exit end for conforming the cut fish to can proportions; means for ejecting the conformed fish; and means responsive to the attainment of a predetermined pressure of the plunger upon the fish for initiating operation of the ejecting means.

29. In a fish canning machine: a conveyor movable in a rectilinear direction, and upon which a mass of fish fillets may be laid so that there are more than one fillet extending transverse to the conveyor and in general parallel relation to each other; means forming a compression chamber transverse to the movement of the conveyor and having an opening opposite the delivery end of the conveyor for the entry of fish from the conveyor; a cutter reciprocable across said opening; means in the chamber for moving fish in said transverse direction; and means at the exit end of said chamber for conforming increments of the fish to can proportions.

JACK GORBY.

REFERENCES CITED

The following references are of record in the file of this patent:

UNITED STATES PATENTS

| Number | Name | Date |
| --- | --- | --- |
| 227,283 | Moore | May 4, 1880 |
| 2,015,089 | Rooney | Sept. 24, 1935 |
| 2,037,724 | Jacobs et al. | Apr. 21, 1936 |
| 2,041,986 | Wetmore | May 26, 1936 |
| 2,044,813 | Rooney | June 23, 1936 |
| 2,411,188 | Borg | Nov. 19, 1946 |